US010793368B2

United States Patent
Shiraki et al.

(10) Patent No.: US 10,793,368 B2
(45) Date of Patent: Oct. 6, 2020

(54) SCREW CONVEYER

(71) Applicant: FUJI CORPORATION, Chiryu (JP)

(72) Inventors: Shohei Shiraki, Toyota (JP); Shigefumi Suzuyama, Toyota (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 16/609,382

(22) PCT Filed: May 8, 2017

(86) PCT No.: PCT/JP2017/017408
§ 371 (c)(1),
(2) Date: Oct. 29, 2019

(87) PCT Pub. No.: WO2018/207241
PCT Pub. Date: Nov. 15, 2018

(65) Prior Publication Data
US 2020/0055676 A1  Feb. 20, 2020

(51) Int. Cl.
B65G 33/32 (2006.01)
B65G 33/10 (2006.01)
(Continued)

(52) U.S. Cl.
CPC .......... B65G 33/32 (2013.01); B23Q 11/0057 (2013.01); B23Q 11/0067 (2013.01); B65G 33/10 (2013.01); B65G 33/14 (2013.01)

(58) Field of Classification Search
CPC ........ B65G 33/10; B65G 33/14; B65G 33/22; B65G 33/24; B65G 33/32; B23Q 11/00; B23Q 11/0057; B23Q 11/0067
(Continued)

(56) References Cited

U.S. PATENT DOCUMENTS 2,818,165 A * 12/1957 Dupps .................... B65G 33/32
198/673
5,553,534 A * 9/1996 Soavi ................. B23Q 11/0057
100/145

(Continued)

FOREIGN PATENT DOCUMENTS

JP  59-165828    * 11/1984
JP  59-165828 U   11/1984
JP  2012-56065 A   3/2012

OTHER PUBLICATIONS

International Search Report dated Jul. 11, 2017 in PCT/JP2017/017408 filed on May 8, 2017.

Primary Examiner — Gene O Crawford
Assistant Examiner — Keith R Campbell
(74) Attorney, Agent, or Firm — Oblon, McClelland, Maier & Neustadt, L.L.P.

(57) ABSTRACT

A screw conveyor including a container-type main body provided with a storage tank; a horizontally oriented delivery pipe a front end of which is connected to the storage tank; a discharge pipe connected to a rear end of the delivery pipe and arranged inclined upwards from a connecting end to another end; a screw arranged across an inside of the storage tank and the delivery pipe; a drive mechanism configured to apply rotation to the screw via a rotation transmission section on a front section of the storage tank on an opposite side to the delivery pipe; and a screw support structure in which multiple support blocks configured to slidably contact the screw are fixed to an inside surface of the delivery pipe at different positions, and in which one or two or more of the support blocks are fixed to a front side of the delivery pipe.

5 Claims, 8 Drawing Sheets

(51) Int. Cl.
*B65G 33/14* (2006.01)
*B23Q 11/00* (2006.01)

(58) Field of Classification Search
USPC .................................................. 198/670, 673
See application file for complete search history.

(56) References Cited

U.S. PATENT DOCUMENTS 10,221,018 B2 * 3/2019 Hirata .................... B65G 65/46
10,501,266 B2 * 12/2019 Maeda ............... B23Q 11/0042

* cited by examiner

SCREW CONVEYER

TECHNICAL FIELD

The present disclosure relates to a screw conveyor for discharging chips to an external section.

BACKGROUND ART

In a machine tool such as a lathe or a machining center, chips are generated as a result of processing. Thus, a discharge conveyor is provided for discharging the chips from the processing section to the outside of the machine tool. In the discharge conveyor, for example, a storage tank provided with an opening for receiving chips and coolant is disposed below a processing section, and chips are fed backward inside the storage tank. The chips are fed to a discharging section which further inclines upward, and the chips discharged from the discharging section are collected in a collecting box. There are various types of such discharge conveyors, such as a hinge belt tip conveyor, a drum-type conveyor, or a screw conveyor. Among them, the following patent literature 1 discloses a screw conveyor.

The conventional screw conveyor in this document has a screw in which spiral blades are formed on the outer periphery of a rotation shaft, and the screw is rotatably supported by bearings and inserted into a casing. As the screw rotates in the casing, chips discharged from the machine tool are pushed by the spiral blades and fed backward. A discharge pipe is connected to the rear side, but in this conventional example, the discharge pipe is formed so as to increase in diameter toward the downstream side, and the conveying resistance decreases at the outlet portion where chips are fed out.

CITATION LIST

Patent Literature

Patent Literature 1: JP-A-2012-056065

BRIEF SUMMARY

Technical Problem

As described above, a conventional screw conveyor is configured to reduce the conveying resistance so that chips are not clogged in the conveying path. In particular, the diameter of the discharge pipe is increased, but chips can also clog the casing of the screw conveyor, that is, inside the delivery pipe. In this regard, in the above-mentioned conventional example, a storage box for increasing the volume of the conveyance path is formed in the downstream-side portion of the delivery pipe so that the downstream-side portion can cope with a case in which the generation amount of chips fluctuates greatly. However, such a storage box or the like cannot be provided unless a sufficient installation space is provided above. In addition, some screw conveyor configurations may have support structures that support the screw in a downstream-side section of the delivery pipe, thus it may not be possible to provide a storage box in a downstream-side section of the delivery pipe.

Accordingly, it is an object of the present disclosure to provide a screw conveyor for which chips do not clog easily in order to solve the above problems.

Solution to Problem

A screw conveyor according to one aspect of the present disclosure includes: a container-type main body provided with a storage tank; a horizontally oriented delivery pipe a front end of which is connected to the storage tank; a discharge pipe connected to a rear end of the delivery pipe and arranged inclined upwards from a connecting end connected to the delivery pipe to another end; a screw arranged across an inside of the storage tank and the delivery pipe; a drive mechanism configured to apply rotation to the screw via a rotation transmission section on a front section of the storage tank on an opposite side to the delivery pipe; and a screw support structure in which multiple support blocks configured to slidably contact the screw are fixed to an inside surface of the delivery pipe at different positions in a circumferential direction, and in which one or two or more of the support blocks are fixed to a front side of the delivery pipe.

Advantageous Effects

According to the above configuration, multiple support blocks are fixed to an inside surface of the delivery pipe so as to be in sliding contact with the screw, and one or two or more of the support blocks are positioned at a front side of the delivery pipe, such that chips fed in the delivery pipe gradually accumulate and become denser as they go backward, but the gap between the screw and the delivery pipe can be ensured because there is no support block on the rear side, or the quantity of support blocks on the rear side is small, meaning that the chips do not easily become clogged.

DESCRIPTION OF EMBODIMENTS

Figure 1:
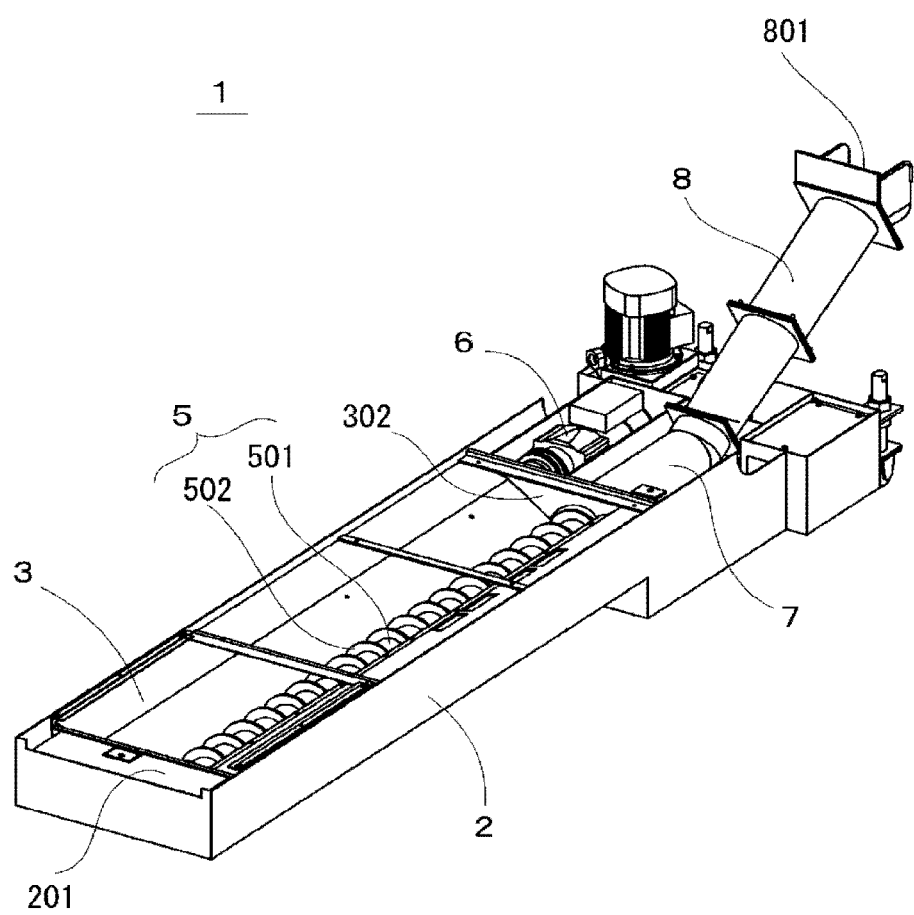
FIG. 1 is a perspective view of an embodiment of a screw conveyor.
Figure 2:
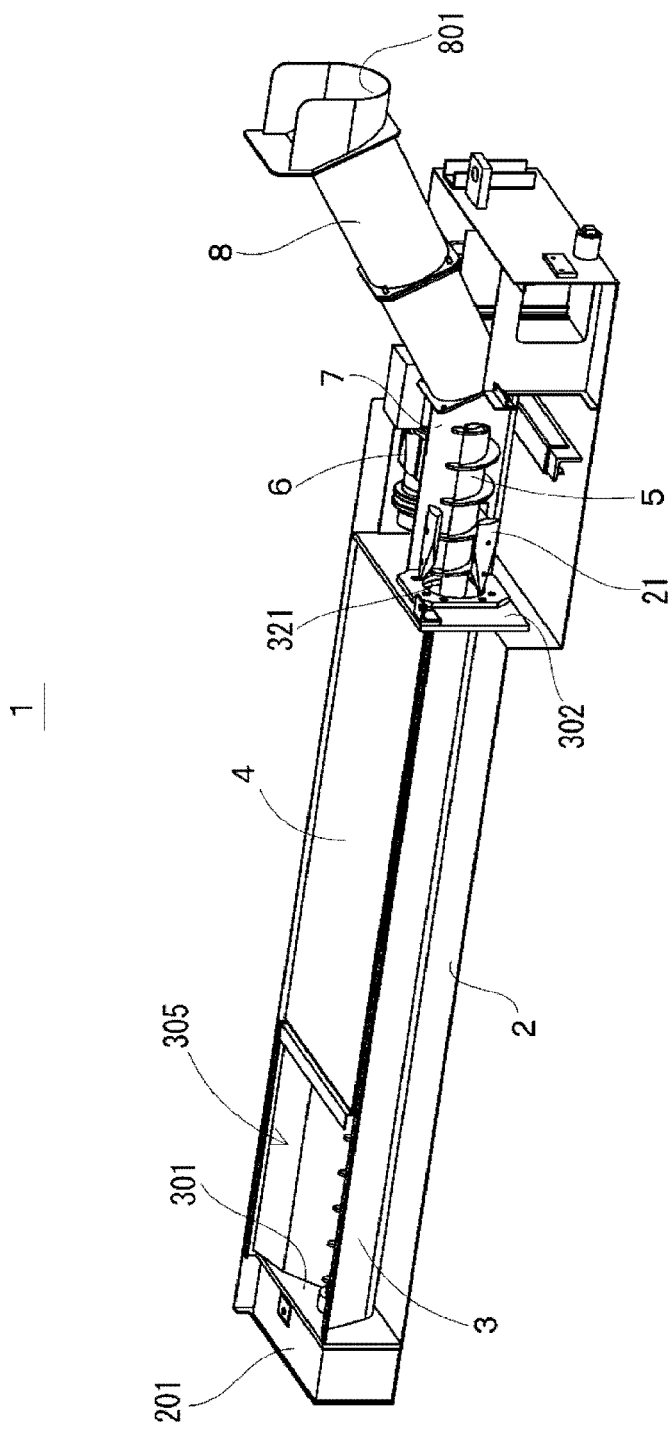
FIG. 2 is a perspective view of the screw conveyor with a portion of a side surface removed.

Hereinafter, an embodiment of a screw conveyor according to the disclosure will be described with reference to the drawings. Here, FIG. 1 is a perspective view of an embodiment of a screw conveyor. To aid understanding of the internal structure, FIG. 2 is a perspective view of the screw conveyor of FIG. 1 with a portion of a side surface at the front end removed. Screw conveyor 1 is installed under a machine tool. In the machine tool, chips are generated by machining or drilling of a workpiece, and a coolant is applied to a machining section where a tool contacts the workpiece. Therefore, chips and coolant drop down from the machine tool during processing. Thus, screw conveyor 1 is installed below the machine tool to receive chips and coolant, and only the chips are conveyed to the outside of the machine.

With screw conveyor 1 of the present embodiment, storage tank 3 is fitted into box-shaped main body 2 having an open upper side. Chips and coolant, which is a liquid that drops down from the machine tool, gather is storage tank 3. As shown in FIG. 2, with screws conveyor 1, the upper portion of storage tank 3 is closed by cover member 4, but a section on the front side of the drawing (a front section of screw conveyor 1) is open, and input port 305 into which coolant and chips are input is formed. Further, screw 5, in which a belt-shaped spiral blade 502 is integrally formed on rotation shaft 501, is rotatably incorporated in storage tank 3.

Storage tank 3 is long in the front-rear direction of screw conveyor 1 and has a V-shape so as to be deeper from the left and right sides in the widthwise direction to the central portion (see FIG. 3), and screw 5 is arranged along the longitudinal direction at a bottom section of storage tank 3. Further, storage tank 3 is partitioned by end plates 301 and 302 whose ends in the longitudinal direction are vertical walls. As shown in FIG. 2, through-hole 321 is formed in rear end plate 302, and screw 5 extends further rearward through through-hole 321. On the other hand, rotation shaft 501 of screw 5 also penetrates front end plate 301, and a shaft receiving member is provided therethrough via a sealing member, and screw 5 is rotatably supported by the shaft receiving member.

Figure 3:
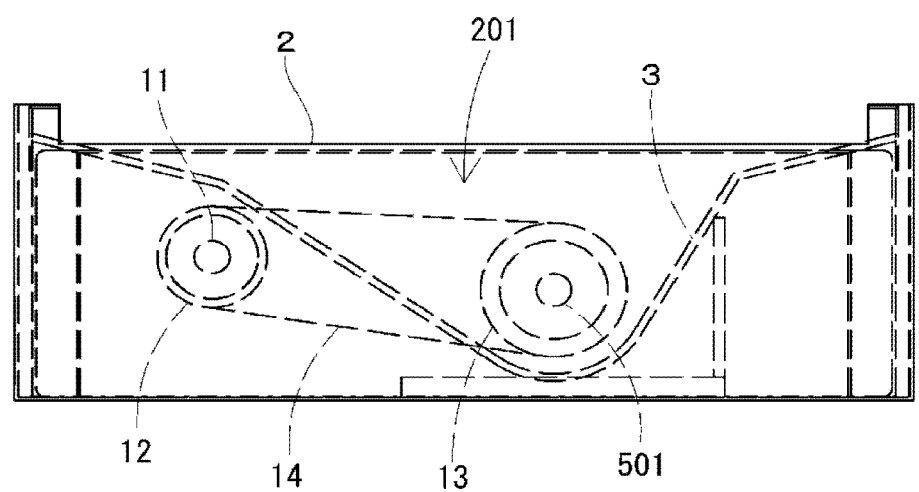
FIG. 3 is a front view of the structure integrated in the main body of the screw conveyor.

Rotation shaft 501 of screw 5 is configured to receive rotation from a drive mechanism via a rotation transmitting section provided in main body front section 201. Here, FIG. 3 is a front view of main body 2 as seen from the front side, and the structure of the rotation transmitting section incorporated therein is shown by broken lines. First, as shown in FIG. 1, with the drive mechanism provided in screw conveyor 1, driving motor 6 is installed on the rear side of main body 2, and shaft 11 connected to the output shaft of driving motor 6 passes below storage tank 3 and extends to main body front section 201 as shown in FIG. 3. With main body front section 201, sprocket 12 is fixed to an end section of shaft 11, and chain 14 is provided connecting sprocket 12 and sprocket 13 fixed to rotation shaft 501 of screw 5.

Further, on the rear side of storage tank 3, cylindrical delivery pipe 7 is fixed to end plate 302 in accordance with the position of through-hole 321, and, on the rear side of that, cylindrical discharge pipe 8 is connected to delivery pipe 7. Since screw 5 passes through through-hole 321 into delivery pipe 7, chips in storage tank 3 are delivered to delivery pipe 7 by screw 5. Delivery pipe 7 is mounted horizontally so that its center substantially coincides with the axial center of rotation shaft 501 of screw 5, while discharge pipe 8 connected to delivery pipe 7 is mounted inclined so as to ascend rearward. Therefore, screw 5 in delivery pipe 7 has its rear end up to a position in front of discharge pipe 8.

With screw conveyor 1, chips fed into delivery pipe 7 by screw 5 are then sequentially fed into discharge pipe 8 and deposited in discharge pipe 8. Then, chips in discharge pipe 8 are pushed up from the bottom to the top as the amount of accumulated chips increases, and finally pushed out from discharge port 801 at the rear end. Since a collecting box is placed under discharge port 801, dropped chips are collected in the collecting box.

However, chips generated by a machine tool have various sizes and shapes depending on the type of processing, and not only fine metallic pieces, but also elongated band-shaped chips are generated. Such chips may become clogged in the screw conveyor and may stop screw 5 from rotating. In particular, with a configuration such as screw conveyor 1, screw 5 only reaches delivery pipe 7, and chips moves upward in discharge pipe 8, such that chips easily become clogged at the boundary between delivery pipe 7 and discharge pipe 8.

Further, screw conveyor 1 of the present embodiment is provided with support blocks 21 for rotatably supporting screw 5 in delivery pipe 7. One end of screw 5 is rotatably supported by a shaft receiving member of rotation shaft 501 at main body front section 201, but a shaft receiving member cannot be provided at the rear end of screw 5 through which chips pass. Therefore, the outer peripheral section of spiral blade 502 is slidably supported by support blocks 21. In the case of screw conveyor 1, three support blocks 21 are fixed to an inner circumferential surface of delivery pipe 7.

Figure 4:
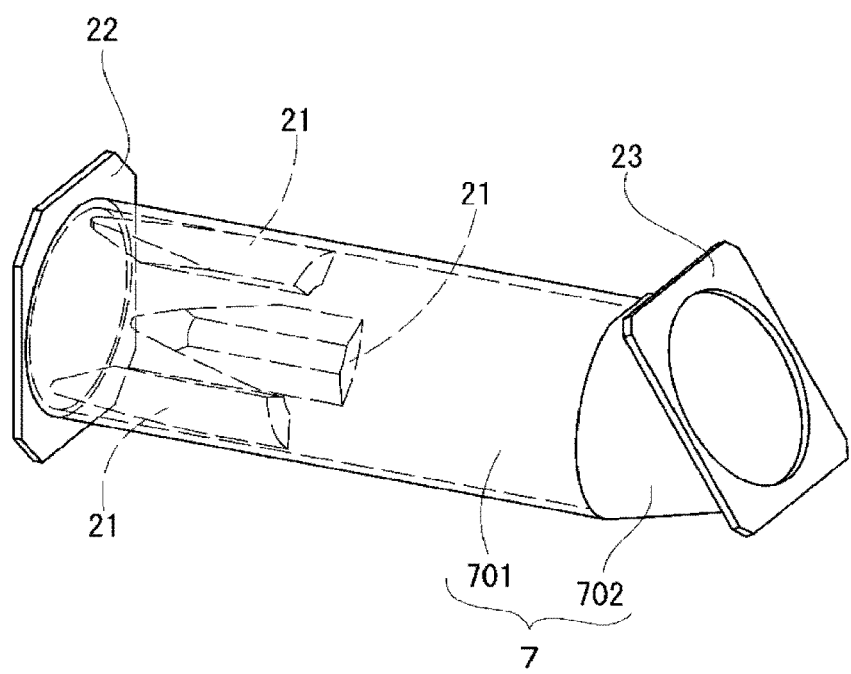
FIG. 4 is an external perspective view showing a delivery pipe.
Figure 5:
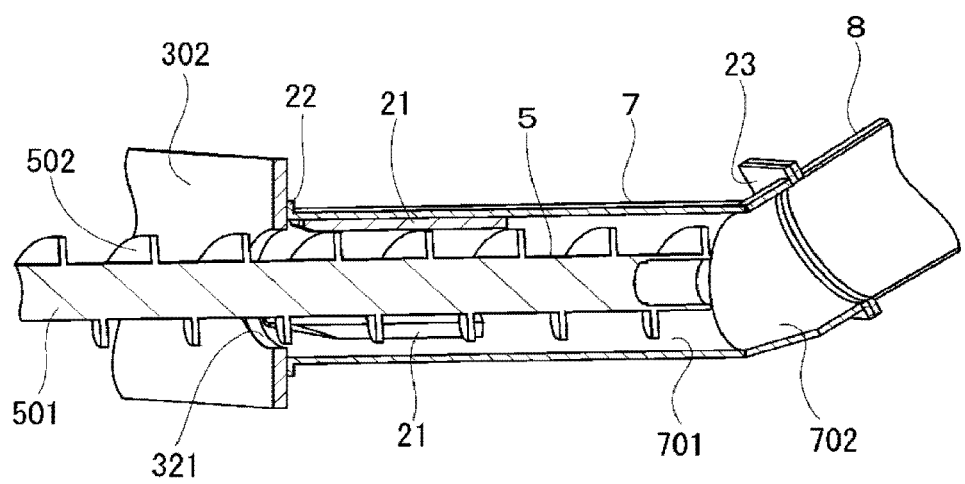
FIG. 5 is a cross-sectional view showing a portion of the delivery pipe.

FIG. 4 is an external perspective view showing delivery pipe 7, in which inner support blocks 21 are indicated by broken lines. FIG. 5 is a cross-sectional view showing a portion of delivery pipe 7. Delivery pipe 7 is composed of straight section 701 containing screw 5, and bent section 702 for connecting to discharge pipe 8. Fixing flange 22 is integrally formed at a front end section on the straight section 701 side, and connecting flange 23 is integrally formed at a rear end portion on the bent section 702 side by welding. Further, with delivery pipe 7, fixing flange 22 is fastened via a sealing member to end plate 302 by bolts, and connecting flange 23 is fastened via a sealing member to the flange of discharge pipe 8 by bolts.

Support blocks 21 are fixed at the front of delivery pipe 7. That is, in order to avoid clogging of chips, in the present embodiment, all the support blocks 21 are provided at a position separated from discharge pipe 8. Support blocks 21 are configured such that screw 5 is rotationally supported on the rear side together with the shaft receiving member of main body front section 201, which stabilizes the rotation so that chips are smoothly fed. However, since support blocks 21 exist as protrusions in the narrow delivery pipe 7, it is considered that the protrusions become an obstacle to chips fed by screw 5, and in particular, band-shaped chips or the like are easily caught, which leads to clogging.

If chips become clogged in delivery pipe 7 or the like, the rotation of screw 5 is stopped. In this case, it is necessary for an operator to scrape out the chips and return the rotation of screw 5 to normal. In this respect, support blocks 21 are formed with a shape such that chips are not caught as much as possible. Specifically, support blocks 21 have an arc shape in which a cross section seen in the front-rear direction widens outward, with a front portion formed in a triangular shape and inclined so that a dimension in the radial direction of delivery pipe 7, that is, a thickness direction, becomes thicker toward the rear. However, even such a support block 21 may cause chips to be caught.

Therefore, investigations were performed with support blocks 21 thought to be the cause of clogging. Here, in particular, arrangements of support blocks 21 have been compared, and as a result, it has been found that it is preferable to arrange support blocks 21 at the front of delivery pipe 7 at a position separated from discharge pipe 8, as shown in FIG. 4. For example, when support blocks 21 are arranged at the rear side of discharge pipe 7 close to discharge pipe 8 (bent section 702), clogging is caused by a given amount of chips being discharged, which stops screw 5 from rotating. On the other hand, when support blocks 21 are arranged at the front side as in the present embodiment, such a situation does not occur.

Upon checking the condition of the rear side arrangement of support blocks 21, many scratches were seen that appeared to be caused by the chips being strongly pressed from bent portion 702 to the inner upper surface of discharge pipe 8. Consider what may be the cause of this. Support blocks 21 cause the space between screw 5 and delivery pipe 7 in the radial direction to become smaller. Inside discharge pipe 8, chips are pushed from below only by the pushing force of screw 5, and such movement is greatly reduced. Accordingly, if the space to the rear of delivery pipe 7 is made narrower by support blocks 21, chips being sent down the pipe are compressed in the space at the rear. Under such conditions, band-shaped chips or the like get caught on support blocks 21, and the chips do not move so easily. Thus, chips become even more compressed in the space at the rear of delivery pipe 7, which is thought to cause clogging.

Therefore, in the present embodiment, support blocks 21 are arranged at the front side of delivery pipe 7 in order to make the space at the rear side of delivery pipe 7 wider so as to prevent chips from being caught. The three support blocks 21 are aligned at positions in the center line direction (front-rear direction) of delivery pipe 7 (straight section 701) and are arranged at equal intervals in the circumferential direction. Further, the diameter of delivery pipe 7 is formed in end plate 302 to be larger than the diameter of through-hole 321. Thus, when delivery pipe 7 is viewed from the storage tank 3 side, support blocks 21 are disposed so as to be hidden behind end plate 302.

With screw conveyor 1 configuration as described above, coolant and chips that drop from the machine tool processing chamber enter storage tank 3 via opening 305, and are sent backward by rotating screw 5. The coolant flows out of storage tank 3 by overflowing, which leaves the chips, and is returned to the tank in main body 2, and is recycled by filtering or the like. On the other hand, the chips are fed to delivery pipe 7 through through-hole 321 by screw 5. Here, with the present embodiment, since chips enter in accordance with the size of through-hole 321, even band-shaped chips are not easily caught by support blocks 21.

The chips fed to the rear side in delivery pipe 7 become gradually less easy to move to the rear side, and the density increases. With the present embodiment, since support blocks 21 are not present on the rear side, a gap between screw 5 and delivery pipe 7 is secured, and chips are not forcedly pushed in and strongly compressed. Therefore, chips are not easily clogged in delivery pipe 7 or discharge pipe 8. Thus, by preventing clogging of chips, screw conveyor 1 is enabled to be continuously operated without stopping screw 5 from rotating.

Figure 6:
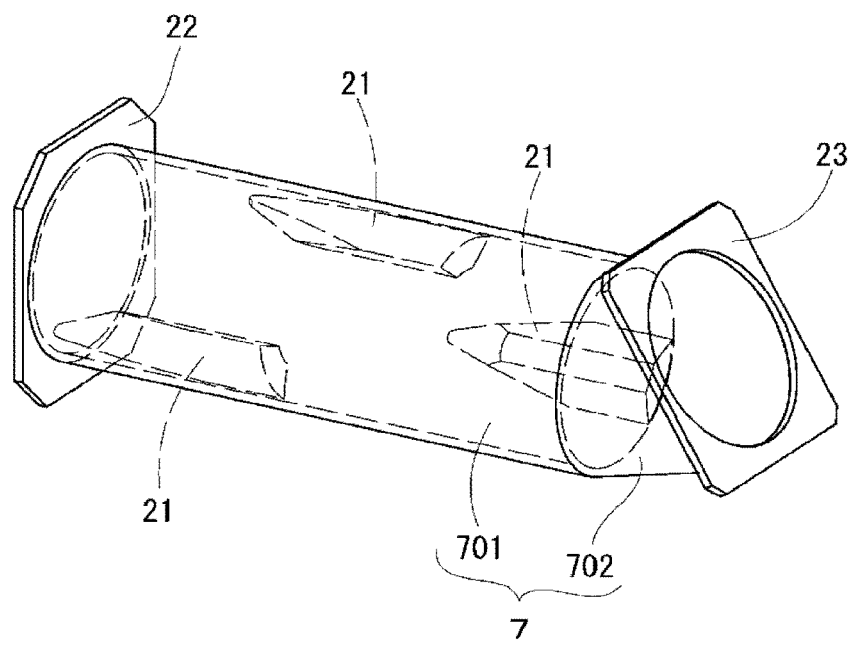
FIG. 6 is an external perspective view showing a delivery pipe of a second embodiment.

Continuing, alternative embodiments of a screw conveyor will be described below. The same components as those of the first embodiment will be described with the same reference numerals. First, FIG. 6 is an external perspective view showing delivery pipe 7, with inner support blocks 21 shown by broken lines. In the second embodiment, the arrangement of support blocks 21 is different from that of the first embodiment. Specifically, the three support blocks 21 are equidistantly spaced in the circumferential direction, but are located at positions shifted in the center line direction (front-rear direction) of delivery pipe 7 (straight section 701), and are arranged on a so-called spiral. Here, the arrangement is such that helical direction of the three support blocks 21 is from close to fixing flange 22 to further away from fixing flange 22, but there are an arrangement following the rotational direction of screw 5 and an arrangement opposite to the rotational direction of screw 5.

With the second embodiment, the three support blocks 21 are separated from each other in the front-rear directions, but the function of supporting the rotating screw 5 is not impaired. Further, a support block 21 is arranged at the rear of delivery pipe 7 where the chips become denser, but since there is only one, the chips are not compressed so much as to become clogged. In addition, since the support blocks 21 are arranged separated from each other, a gap between screw 5 and delivery pipe 7 is secured across the entire length, thereby enabling smooth conveyance of chips. Also, it is considered that making the helical arrangement of the three support blocks 21 reverse to the rotation of screw 5 makes the chips less susceptible to catching.

Figure 7:
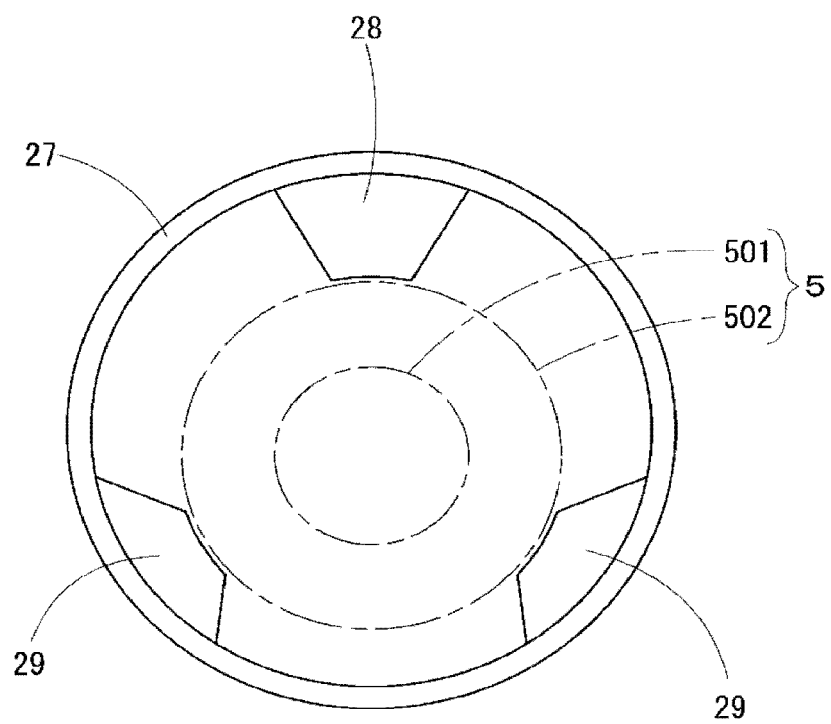
FIG. 7 is a simplified diagram showing a delivery pipe of a third embodiment in the front-rear direction.

Next, FIG. 7 is a simplified view showing the delivery pipe in the front-rear direction. Delivery pipe 27 of a third embodiment is a cylindrical pipe formed to have a diameter larger than that of delivery pipe 7 of the first embodiment, and three support blocks 28 and 29 are fixed to the inner peripheral surface in the same manner. However, support block 28 out of the three support blocks is formed to have a larger dimension in the radial direction, that is, the thickness direction, of delivery pipe 27 than the other two support blocks, support blocks 29. Further, support block 28 is arranged at the highest position in delivery pipe 27. In the drawing, the position of screw 5 is indicated by a single-dashed line, and as can be seen from this, the center of delivery pipe 27 and the axial center of rotation shaft 501 are vertically offset. Note that, the positions of support blocks 28 and 29 in the front-rear direction are the same as those of the first or second embodiment.

In the present embodiment, the gap between screw 5 and delivery pipe 27 is widened on the upper side of screw 5 by providing support block 28 on the upper side. This is because chips fed while being agitated by the rotation of screw 5 tend to move upward. Therefore, by such a configuration, the compression of the chips can be suppressed, meaning that the chips do not easily become clogged in delivery pipe 27 or discharge pipe 8.

Figure 8:
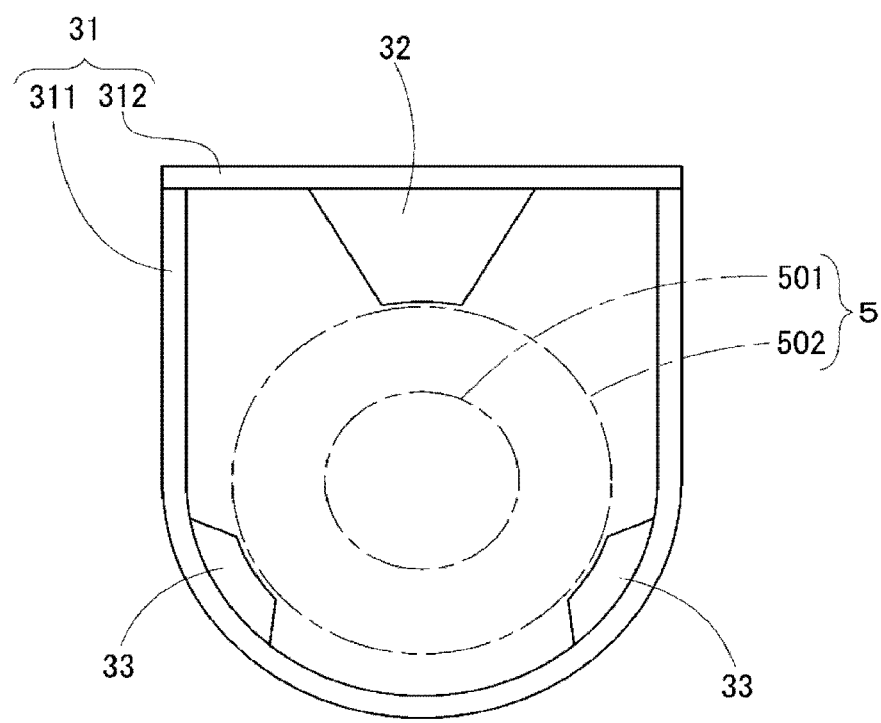
FIG. 8 is a simplified diagram showing a delivery pipe of a fourth embodiment in the front-rear direction.

Further, FIG. 8 is a simplified view showing the delivery pipe in the front-rear direction. Delivery pipe 31 of a fourth embodiment is formed integrally by joining cover 312 on a U-shaped groove main body 311. In the same manner as above, three support blocks 32 and 33 are fixed to the inner peripheral surface. However, support block 32 of the three support blocks is formed to be larger than the other two support blocks, support blocks 33, and is fixed to cover 312. Also in this embodiment, the gap between screw 5 and delivery pipe 31 is widened on the upper side of screw 5. Therefore, chips fed while being agitated by the rotation of screw 5 tend to move upward, compression of the chips is suppressed, such that chips do not easily get clogged in delivery pipe 31 or discharge pipe 8.

Note that, in the third and fourth embodiments, support blocks 28 and 32, which are thick, are provided to increase the gap between delivery pipe 27 or 31 and screw 5. In particular, the gap on the upper side of screw 5 is large. However, a good result may be obtained by equalizing the gap in each direction as in the first and second embodiments. On the other hand, it is not preferable to make the diameter of the delivery pipe too large when the screw has a low-profile construction such as with screw conveyor 1. Therefore, from the point of view of the gap, when examining a configuration corresponding to demands for prevention of clogging of chips and compactness, it was found that the following configuration is desirable.

Specifically, with the embodiment shown in FIG. 7, when the inside of delivery pipe 27 is viewed in the center line direction (direction penetrating the surface in the drawing), the screw conveying cross-sectional area corresponding to the cross-sectional area of spiral blade 502 of screw 5 and the clearance cross-sectional area corresponding to a clearance portion between an inner diameter of delivery pipe 27 and an outer diameter of spiral blade 502 excluding the cross-sectional area of support blocks 28 and 29 are designed to be substantially the same. The same applies to delivery pipes 7 and 31, and it is desirable that the screw conveying cross-sectional area occupied by screw 5 and the clearance cross-sectional area except for screw 5 and support blocks 21, 32, and 33 are substantially the same when the inside of the delivery pipe is viewed in the direction of the center line.

The above describes embodiments of the present disclosure, but embodiments are not limited to these and various changes may be employed without departing from the scope of the disclosure.

For example, the shape of the support blocks, the arrangement position, and the like may be further modified.

REFERENCE SIGNS LIST

1: screw conveyor;
2: main body;
3: storage tank;
5: screw;
7: delivery pipe;
8: discharge pipe;
21: support block

The invention claimed is:

1. A screw conveyor comprising:
a container-type main body provided with a storage tank;
a horizontally oriented delivery pipe, a front end of which is connected to the storage tank;
a discharge pipe connected to a rear end of the delivery pipe and arranged inclined upwards from a connecting end connected to the rear end of the delivery pipe to another end;
a screw arranged across an inside of the storage tank and the delivery pipe;
a drive mechanism configured to apply rotation to the screw via a rotation transmission section on a front section of the storage tank on an opposite side to the delivery pipe; and
a screw support structure including multiple support blocks fixed to an inside surface of the delivery pipe at different positions in a circumferential direction, the support blocks configured to slidably contact the screw,
wherein at least one of the support blocks are fixed to a front side of the delivery pipe and at least one of the support blocks are provided at a different longitudinal position of the delivery pipe.

2. A screw conveyor according to claim 1, wherein the screw support structure is configured such that all of the support blocks are at the front side of the delivery pipe.

3. A screw conveyor according to claim 1, wherein the screw support structure is configured such that all of the support blocks are at different longitudinal positions of the delivery pipe.

4. A screw conveyor comprising:
a container-type main body provided with a storage tank;
a horizontally oriented delivery pipe a front end of which is connected to the storage tank;
a discharge pipe connected to a rear end of the delivery pipe and arranged inclined upwards from a connecting end connected to the rear of the delivery pipe to another end;
a screw arranged across an inside of the storage tank and the delivery pipe;
a drive mechanism configured to apply rotation to the screw via a rotation transmission section on a front section of the storage tank on an opposite side to the delivery pipe; and
a screw support structure in which multiple support blocks configured to slidably contact the screw are fixed to an inside surface of the delivery pipe at different positions in a circumferential direction, and in which one or two or more of the support blocks are fixed to a front side of the delivery pipe,
wherein the screw support structure is configured such that one of the support blocks located above at an axis center of the screw is formed to be larger in a diameter direction than the support blocks in other positions, and a center axis of the screw and a center line of the delivery pipe are offset.

5. A screw conveyor comprising:
a container-type main body provided with a storage tank;
a horizontally oriented delivery pipe a front end of which is connected to the storage tank;
a discharge pipe connected to a rear end of the delivery pipe and arranged inclined upwards from a connecting end connected to the rear of the delivery pipe to another end;
a screw arranged across an inside of the storage tank and the delivery pipe;
a drive mechanism configured to apply rotation to the screw via a rotation transmission section on a front section of the storage tank on an opposite side to the delivery pipe; and
a screw support structure in which multiple support blocks configured to slidably contact the screw are fixed to an inside surface of the delivery pipe at different positions in a circumferential direction, and in which one or two or more of the support blocks are fixed to a front side of the delivery pipe,
wherein when the inside of the delivery pipe is viewed from a center line direction, a screw-conveying cross-sectional area corresponding to a cross-sectional area of a spiral blade of the screw, and a clearance cross-sectional area that corresponds to a clearance portion between an inner diameter of the delivery pipe and an outer diameter of the spiral blade excluding the support blocks are substantially equal.

* * * * *